US008327268B2

(12) United States Patent
Herberger et al.

(10) Patent No.: US 8,327,268 B2
(45) Date of Patent: *Dec. 4, 2012

(54) SYSTEM AND METHOD FOR DYNAMIC VISUAL PRESENTATION OF DIGITAL AUDIO CONTENT

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 462 days.

This patent is subject to a terminal disclaimer.

(21) Appl. No.: 12/615,832

(22) Filed: Nov. 10, 2009

(65) Prior Publication Data

US 2011/0113331 A1    May 12, 2011

(51) Int. Cl.
*G06F 15/00* (2006.01)
*G06F 3/00* (2006.01)

(52) U.S. Cl. ........................................ 715/723; 715/725

(58) Field of Classification Search .......... 715/723–726, 715/727–728, 762–764
See application file for complete search history.

(56) References Cited

U.S. PATENT DOCUMENTS

| | | |
|---|---|---|
| 5,404,316 A | 4/1995 | Klingler et al. |
| 5,467,288 A | 11/1995 | Fasciano et al. |
| 5,469,370 A | 11/1995 | Ostrover et al. |
| 5,682,326 A | 10/1997 | Klingler et al. |
| 5,754,179 A | 5/1998 | Hocker et al. |
| 5,760,767 A | 6/1998 | Shore et al. |
| 5,781,188 A | 7/1998 | Amiot et al. |
| 5,801,694 A | 9/1998 | Gershen |
| D403,674 S | 1/1999 | Arora et al. |
| 5,861,880 A | 1/1999 | Shimizu et al. |
| 5,886,698 A | 3/1999 | Sciammarella et al. |
| 5,969,716 A | 10/1999 | Davis et al. |
| 5,999,173 A * | 12/1999 | Ubillos .......................... 715/724 |
| 6,134,243 A | 10/2000 | Jones et al. |
| 6,154,207 A | 11/2000 | Farris et al. |
| 6,204,840 B1 | 3/2001 | Petelycky et al. |
| 6,222,537 B1 | 4/2001 | Smith et al. |
| 6,243,087 B1 | 6/2001 | Davis et al. |
| 6,388,181 B2 | 5/2002 | Moe |
| 6,388,686 B1 | 5/2002 | Hetherington et al. |
| 6,400,378 B1 | 6/2002 | Snook |
| 6,426,778 B1 | 7/2002 | Valdez, Jr. |
| 6,544,293 B1 | 4/2003 | Ohanian |
| 6,573,909 B1 | 6/2003 | Nagao |
| 6,628,304 B2 | 9/2003 | Mitchell et al. |
| 6,662,231 B1 | 12/2003 | Drosset |
| 6,740,802 B1 | 5/2004 | Browne, Jr. |

(Continued)

FOREIGN PATENT DOCUMENTS

EP    1 666 967 A1    6/2006

(Continued)

*Primary Examiner* — Cao "Kevin" Nguyen
(74) *Attorney, Agent, or Firm* — Fellers, Snider, Blankenship, Bailey & Tippens, P.C.; Terry L. Watt (57) ABSTRACT

There is provided a system and method that allows a user to visually manage and work with large numbers of digital audio tiles. Each audio file will preferably be analyzed by the instant invention, with the analysis results being used to position an icon representative of that file within an on-screen 2D- or 3D-display. Methods will be provided that allow user to preview and use individual audio items that are displayed on-screen. Selection of an on-screen icon will be used to initiate playback of the associated audio file, insert that file into a playlist, incorporate that file into a multimedia work, etc.

12 Claims, 7 Drawing Sheets

U.S. PATENT DOCUMENTS

| | | | |
|---|---|---|---|
| 6,775,659 B2 | 8/2004 | Clifton-Bligh | |
| D501,484 S | 2/2005 | Platz et al. | |
| 6,925,608 B1 | 8/2005 | Neale et al. | |
| 6,928,433 B2 | 8/2005 | Goodman et al. | |
| 6,972,363 B2 | 12/2005 | Georges et al. | |
| 7,143,392 B2 | 11/2006 | Li et al. | |
| 7,194,686 B1 | 3/2007 | Suzuki et al. | |
| 7,225,405 B1 | 5/2007 | Barrus et al. | |
| D554,144 S | 10/2007 | Hally et al. | |
| 7,290,223 B2 | 10/2007 | Decombe | |
| 7,295,977 B2 | 11/2007 | Whitman et al. | |
| 7,305,273 B2 | 12/2007 | Fay et al. | |
| 7,434,170 B2 | 10/2008 | Novak et al. | |
| 7,454,329 B2 | 11/2008 | Abe et al. | |
| 7,582,823 B2 | 9/2009 | Kim et al. | |
| 7,831,127 B2* | 11/2010 | Wilkinson | 370/406 |
| 7,930,347 B2* | 4/2011 | Maxwell et al. | 709/205 |
| 2002/0107973 A1* | 8/2002 | Lennon et al. | 709/231 |
| 2003/0002851 A1 | 1/2003 | Hsiao et al. | |
| 2003/0030661 A1 | 2/2003 | Miyauchi et al. | |
| 2003/0160944 A1* | 8/2003 | Foote et al. | 352/1 |
| 2005/0010589 A1 | 1/2005 | Novak et al. | |
| 2005/0022132 A1 | 1/2005 | Herzberg et al. | |
| 2006/0016322 A1 | 1/2006 | Randle et al. | |
| 2006/0048076 A1 | 3/2006 | Vronay et al. | |
| 2006/0112808 A1 | 6/2006 | Kiiskinen et al. | |
| 2006/0181537 A1 | 8/2006 | Vasan et al. | |
| 2007/0107584 A1 | 5/2007 | Kim et al. | |
| 2007/0176922 A1 | 8/2007 | Ikeda et al. | |
| 2007/0245257 A1 | 10/2007 | Chan et al. | |
| 2008/0301128 A1 | 12/2008 | Gandert et al. | |
| 2008/0314228 A1 | 12/2008 | Dreyfuss et al. | |
| 2009/0013004 A1 | 1/2009 | Manukyan et al. | |
| 2009/0132077 A1 | 5/2009 | Fujihara et al. | |
| 2009/0132591 A1 | 5/2009 | Toms et al. | |
| 2009/0193351 A1 | 7/2009 | Lee et al. | |
| 2009/0228481 A1 | 9/2009 | Neale et al. | |

FOREIGN PATENT DOCUMENTS

| | | |
|---|---|---|
| WO | WO 2008014268 A2 | 1/2008 |

* cited by examiner

SYSTEM AND METHOD FOR DYNAMIC VISUAL PRESENTATION OF DIGITAL AUDIO CONTENT

FIELD OF THE INVENTION

The present invention relates generally to the field of data processing and more specifically to methods, systems and products for visual presentation of digital audio content.

BACKGROUND OF THE INVENTION

Over the last few years digital multimedia content has become increasingly available to the public. High-performance home computers, the ever increasing availability of broadband data-networks, efficient data compression methods and high capacity storage media have all played a role in the increasing access to and demand for multimedia content among individual users as well as in the corporate sector. More importantly for purposes of the instant invention, the increase in demand for, and usage of, digital audio works has been especially noticeable. Today audio content is almost exclusively created, stored and transferred in digital form.

When a digital audio content collection has reached a certain size, a number of problems manifest themselves. The same problems are encountered by a user who is trying to manage his or her private audio collection or by a music editor who seeks to create new musical content. The main problem is that as the size of the music collection grows, the user increasingly loses the ability to keep track of its content.

The conventional approach to solving this problem is by using a database, wherein a user's audio collection is stored in a content database designed for that purpose. Each item stored in that database typically has some minimal amount of metadata associated with it (e.g., song title, performer, style, etc.) that describes the content. A computer-based database allows a user to quickly locate and select/playback a particular song or content item.

However, a database-based approach to manage a large number of digital content items is most useful to the user who has intimate knowledge of his or her digital audio collection and is able to identify with some particularity the digital item which he or she wants to listen to or edit. Thus, the database approach provides the user with help regarding the classification of the digital content but may not be the best tool for exploring its contents.

This approach does not provide easy access to the digital content, where "easy access" means that the user can quickly and easily find and select content stored in the database.

What is needed is a system and method where the entirety of a digital audio collection is made easily accessible. Additionally, this system should organize digital content according to its inherent properties. Furthermore, it would be preferably if the system were to allow a user to navigate its file structure using familiar techniques. Finally, it would be of particular advantage if this approach were usable both by a user who is interested in multimedia editing as well as a user who is trying to manage a large digital music database.

Heretofore, as is well known in the media editing industry, there has been a need for an invention to address and solve the disadvantages of prior art methods. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for dynamic visual presentation of organized digital audio content. The instant invention will be useful to users engaged in music editing as well as users looking for ways to manage their digital audio content. The system will preferably allow the user to visually display the entirety of a digital audio database in a single display by using graphical objects that represent the items therein, and further allow the user to quickly maneuver through the content. The system ill preferably automatically analyze the content of a database and create a visual representation based on this analysis.

The preferred layout of the representation will be based on the results of the analysis of the content of the database. Graphical objects representing musical items that are similar to each other will be positioned on the screen in the vicinity of each other. The instant invention will preferably allow the user to maneuver within the graphical display at different levels. The on-screen presentation will preferably be updated dynamically as the user navigates through the database or adds new content to it.

The preferred method will provide the user with direct access to every item in the database at any time. Additionally, it will preferably allow the user to preview (pre-listen) each audio item. Further, the user will preferably be able to manage the content of the database and perform actions such as changing attributes, deleting digital content items, etc. The instant invention will also, and preferably, automatically reflect changes in the database content in the visual representation of same by rearranging on screen graphical objects representing the digital content items according to the changed attributes.

The instant invention will preferably provide the user with at least two different approaches for classifying audio content, with the results of each individual classification being used to control the visual appearance of the database content. In the first preferred classification approach, the visual representation will be created by using metadata associated with each audio work in the database.

The second preferred approach is based on an analysis of the musical characteristics of the audio items. Values obtained from such an analysis will be used to create a visual representation that reflects the structure of the database. The instant invention preferably provides the user with an option to choose between the two approaches, with differences in the two approaches being reflected in a different visual representation.

In brief, the instant invention preferably provides the user of music editing or digital music management software with a visual representation of the complete content of an associated database. The preferred method graphically will preferably display icons that are representative of the entire content of the database in a single display and allow the user to navigate through the audio content by interacting with the on-screen representations. Additionally, the instant invention will preferably organize the content of the database and display similar icons that correspond to similar audio items next to each other on the screen. The user will preferably be able to switch between the approaches dynamically, with the instant invention changing its visual representation accordingly. By maneuvering within the visual representation the user will preferably be able to preview any data items in the visual representation by selecting the graphical representation. Similarly, the user will be able to insert the items, represented as graphical objects, into a playlist or a potential music work.

In another preferred embodiment the instant invention will provide the user not only with a flat graphical view of the database contents, but also a multi-layer arrangement, wherein multiple layers are utilized in the same visual representation. In this variation, the user will preferably be able to access the different layers by interacting with the visual representation using well known interaction devices like a computer mouse, a computer keyboard, direct activation of a touch-screen display, etc.

According to a preferred embodiment the instant invention preferably will begin by activating a program which implements the visual aspect of the instant invention. The instant invention will preferably be made a part of, or be callable from within, a digital media management program or a digital music creation program. Within the program the user will preferably, as a first step, identify the location where the audio content is stored. Preferably, the content will already be stored in a database; however that is not a requirement, as the instant invention will process and store the audio items in an appropriate database if need be.

In a next preferred step the instant invention will analyze each audio file and will import the content into the associated database (if the content is not already in the database). During import certain metadata that is associated with each audio item will preferably be read and stored in a data vector that is linked to that item. Additionally, the instant invention will preferably also carry out an analysis of the musical features of each audio item. Characteristics of the audio item such as tempo, rhythm, and key, etc., will preferably be calculated and stored within the data vector for each item. Additionally, the instant invention will preferably place the storage location (e.g., the directory path) of the audio item in the data vector. Furthermore, each data item will preferably be provided with a serial number or other unique value that can serve to identify that item. This data value will be referred to as its ID hereinafter. Preferably, this value will also be stored in the data vector of each audio item.

In the next preferred step, the user will preferably specify which display mode will be used. There are two preferred display modes: metadata mode and analysis mode. Depending on the mode, the instant invention will utilize different values from the data vector associated with each audio item. Preferably, the information needed by each of the operational modes will be created and inserted when the audio items are inserted into the database.

In the metadata mode the instant invention will preferably read the necessary values from the data vector for each individual data item. In the analysis mode, the instant invention will preferably normalize the values determined in the analysis step (to be discussed below) and create a summary value from the normalized values. In the preferred embodiment, this summary value will be the summation of the analysis values. The sum represents a composite of the features of each data item and is used by the instant invention as a means of measuring the similarity between the data items. The sum will also preferably be precomputed (or, alternatively, computed on the fly) and stored within the data vector associated with each audio item. The instant invention will preferably store all of the data values that might be used in connection with either mode of operation within the data vector for use during a user's session, at which time changes that are made by the user may require a dynamic update to be made. For example, the selection of a different display mode by the user during a session will preferably necessitate a change in the on-screen display. Preferably, this change will be achieved by reading the previously stored data values from the data vector for each of the on-screen audio items.

As a next preferred step the instant invention will preferably create a visual representation that is dependent on the mode selected by the user. In the metadata based visual representation, the instant invention will preferably read one or more data values from the data vector(s) and incorporate this information value into the visual representation.

By way of illustration, assume for purposes of discussion that the following sorts of metadata might be available: sound pool type, musical style, audible instrument(s), loop number, etc. The stored data for a particular audio item might take the form of sound pool "01," the "techno" style, a "hi-hat" instrument, and correspond to loop "03a". As is described in greater detail below, the instant invention will utilize this sort of information to create a visual representation, including layers representing sound pool, style, instrument, and loop, etc.

In operation, the instant invention preferably reads the metadata for each selected data item in the database and automatically creates an associated dynamic visual representation of same. Although this might be done in many different ways, in the preferred embodiment the graphical representation of each item will reflect its data vector components, e.g., where one sound pool contains more data items than another, the graphical object associated with the larger sound pool will be similarly larger in the on-screen display. Additionally the instant invention will preferably arrange the graphical display so that representations of all of the currently selected audio items will be viewable on-screen within a single graphical display. To achieve this, in one preferred embodiment the audio items (e.g., the loops that belong to a specific sound pool, style, and/or instrument, etc.) will be positioned on-screen according to the audio item's sonic properties. The instant invention will preferably automatically adjust the size of each graphical object depending on the number of items that are to be displayed.

In the analysis-based mode the instant invention will preferably read each item's summed attribute value and use that value to create the on-screen representation, with the graphical objects that correspond to similar summed values being positioned adjacent to each other. Additionally, the instant invention will preferably add textual information to the display. The text might include information such as the genre, instrument type, etc., which information would be useful to the user who is viewing the screen. Preferably, predefined threshold values and comparison data will be used to determine which attribute represents which genre. Further, and preferably, the objects in the graphical display will be grouped according to the summed value, or other calculated attribute, with the user being able to rearrange the icons in the graphical display as is discussed hereinafter.

In the next preferred step the user will be able to manipulate the on screen representations/icons. The visual representation will preferably be presented in a full screen mode, however other display modes are also possible.

The user will preferably be able to navigate on-screen using familiar interaction methods such as a mouse, a keyboard, a combination of the two, direct activation of a touch-screen display, etc. The preferred interaction method is by a computer mouse, where the user can move the cursor by moving the computer mouse in a horizontal or a vertical direction. The screen display will then automatically be updated once the user reaches a border of the displayed visual representation. In some preferred embodiments, when hovering, i.e., leaving the cursor stationary and positioned above a graphical object for longer than a predetermined amount of time, (e.g., 3 seconds) the instant invention will automatically initiate a preview of the item represented by that icon. This preview might comprise playing a short section, e.g., 30 seconds, of the associated audio item. Depending on the software, in some preferred variations, double clicking on on-screen object will add the associated audio file to a playlist (if the software is a media management program) or into a musical work (if the software is an audio editing program). Preferably this operation (double clicking) will not actually copy the associated audio file but instead it will cause a link to the file to be created.

In the preferred embodiment, the user will be able to move horizontally and vertically on the screen and, preferably, further be able to navigate in the third dimension, i.e., the user will be able to initiate a zoom-like operation. This three dimensional navigation will preferably be available in all program modes, e.g., media management mode and the music creation mode. However, its preferred use is in connection with the music creation mode. This option will make it possible for the user to navigate between different on-screen layers. Preferably, the mouse wheel will be used to initiate the zoom-in or zoom-out option. The instant invention will preferably dynamically update the displayed items so that the visual representation reflects the current zoom state. This might be done, for example, by displaying a percentage value, 100 percent being the standard (unzoomed) view.

As has been described previously, each data item will be provided with a unique ID value, wherein the ID value will preferably be used to identify each data item. Further, each data item will preferably be associated with coordinates that describe its position on the screen, thereby making it easy to locate. The coordinates will preferably be created dynamically during the use and creation of the visual representation.

The instant invention will preferably continually detect the coordinates of the cursor, whether that cursor is controlled by keyboard, mouse, or other device. If the user desires to preview a displayed data item, he or she, as has been explained previously, will preferably move and hover the cursor above the graphical object, that represents that item, for a predefined period of time—preferably three seconds. When the instant invention detects such a hovering, the following steps will preferably be executed.

As a first preferred step, the instant invention will recognize the coordinates of the cursor and associate them with the coordinates of an icon, thereby identifying and selecting an audio item. This identification will preferably be accomplished through the use of the ID that has been assigned to that item. Once an item has been identified, the instant invention will preferably access the database and select the audio file that corresponds to that item. In the next preferred step an applet that has been designed for previewing the data items will be started and its GUI will be integrated into the visual representation. The applet will then preferably provide a preview of the selected data item or choose another item if that is desired. That is, the user will not have to listen to the entirety of a clip and during the preview another item may be selected at any time.

If the user intends to incorporate an audio item into a playlist (in case of the media management program) or into the framework of a multimedia work (in case of the digital music creation program), the user will preferably be able to do so by either a double click or using a predetermined key on the computer keyboard. The steps involved will preferably be similar to those for previewing data items. The instant invention will preferably determine the current location of the cursor by detecting its screen coordinates which will then be used to determine the ID of the selected item. This ID will then be compared with ID values stored in the database to identify which data item has been selected. In a next preferred step, the instant invention will select the data item for incorporation into a playlist or a multimedia work. Note that preferably only a link or other designation will be inserted into the playlist or the framework of the multimedia work and that the data itself will not be copied.

The two- and the three-dimensional movement options will preferably be the same. After an indication by the user that he or she wishes to move into a different layer of the visual representation, the instant invention will preferably treat the newly generated visual representation as a single layer. Coordinates will preferably be assigned to each data item, with the coordinates describing the location of the data items within the newly generated visual representation.

It should be clear that an approach such as this would be a tremendous aid to the user who wants to manage a large database of digital audio files. The user will be preferably provided with a visual presentation of the entire content of the database no matter how large that database might be. The instant invention will be useful in administering large digital audio databases, creating or editing digital music works, etc. By placing sonically similar media items proximate to each other within a screen display, the user will be able to quickly survey the database contents and additionally will be able to see which items are somewhat similar to each other. All of this is discernible with just one look at the screen.

The visual representation will preferably be dynamic, which means that when new content is added to the underlying database, the on-screen display will preferably be automatically updated. With this approach, the efficiency of a multimedia editing program will be clearly enhanced. A user who is trying to create or edit a digital music work can quickly see which audio works are compatible with each other and additionally the user can more quickly find, select, and insert audio items into a digital audio work. Similarly, the efficiency of managing digital audio content will be enhanced when coping with a large audio database. The user will be able to access the content much more quickly. In addition, the instant visual approach provides the user with a new way to look at his or her digital audio collection.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein the reference numerals indicate the same parts throughout the several views, there is provided a system and method for visual representation of digital audio content which significantly decreases the effort required to manage and administer a digital content library and which, additionally, allows the user to quickly survey the entire contents of the library in one visual display. The instant invention will preferably enable the user to maneuver within the visual representation by using familiar computer selection and interaction mechanisms. Preferably, the user will be able to navigate through the on-screen display in two and three dimensions. The instant methods are best used in connection with media management or media creation software systems.

By way of general explanation and in accord with the preferred embodiment, it is to be understood that when the phrase "visual representation of audio content" is used herein, that phrase will preferably be interpreted as meaning providing an automatic process that creates a visual representation of the contents of a digital audio library. Additionally, the instant invention will preferably create its visual representation by sorting the digital audio items based on a previously generated analysis result. The instant invention would be especially suitable for use with media creation and media management applications. The basic steps will preferably be the same for both approaches. The instant invention, however, preferably uses different sorts of analysis results when creating the respective visual representations.

The preferred embodiment of the instant invention utilizes a combination of analysis and creation operations which have been selected to increase the utility of the invention. The steps associated with these operations will preferably be initiated automatically upon activation of a program that embodies the instant invention. The user will preferably be provided with a graphical user interface that displays the complete content of a digital library in one screen. Furthermore, the instant invention will preferably provide the user with the ability to use left/right, forward/backward mouse motions to explore the database content. The analysis operations will preferably be executed without user interaction and, preferably, without user input. The analysis operations will provide the data foundation for the creation of the visual representation. Note that in some preferred embodiments the database will be a traditional (e.g., hierarchical, relational, flat, etc.) database. However, those of ordinary skill in the art will recognize that a database usable by the instant invention might consist of a number of separate digital audio files organized into a file/directory structure. As such, when the term "database" is used herein that term should be broadly construed to include formal, as well as informal, arrangements. Finally, it should be noted and remembered that the database might reside locally on the user's own computer or it might be accessed over a network connection (e.g., LAN, WAN, etc.) such as often done.

In media management mode, the instant invention will analyze the musical properties of the database items and calculate a value which will then preferably be used as a starting point for the placement of the items into the visual representation. In media creation mode, the instant invention will preferably read and analyze the metadata and the data that is already stored along with the each item in the database. By using this data, the instant invention will preferably be able to generate the visual representation. Furthermore, the instant invention makes it possible for the user to initiate three-dimensional movement through the visual representation. The workflows, additional specifications and individual embodiments regarding the instant invention will be described in more detail below.

Note that the terms "metadata" and "metadata value" as terms used herein should be understood to refer to parameters/parameter values that describe some characteristic of an associated audio file. Further, a metadata value might be a single text or numerical value (e.g., a tempo, the genre of the audio file, etc.) or it might be multiple alphanumeric values (e.g., the title of the song, an (x,y) coordinate pair, a listing of the time points in the song where chord changes occur, etc.).

Figure 1:
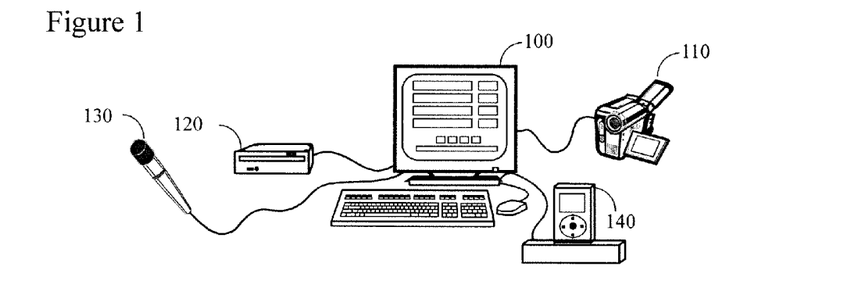
FIG. 1 depicts the general working environment of the instant invention.

As is generally indicated in FIG. 1, at least a portion of the instant invention will be implemented in form of software running on a user's computer 100. Such a computer will have some amount of program memory and hard disk storage (whether internal or accessed via a network) as is conventionally utilized by such units.

Additionally, it is possible that an external camera 110 of some sort will be utilized with and will preferably be connectible to the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further, given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing hardware between it and the computer is utilized. Additionally, a microphone 130 might be utilized so that the user can add voice-over narration to the multimedia work and a CD or DVD burner 120 could be useful for storing individually selected user data/content. Additionally to that, a portable music device 140 or at least a portable device capable of playing back digital music files will preferably be connected or connectible to the computer to allow the user to exchange digital music files between the computer and the portable device.

Figure 2:
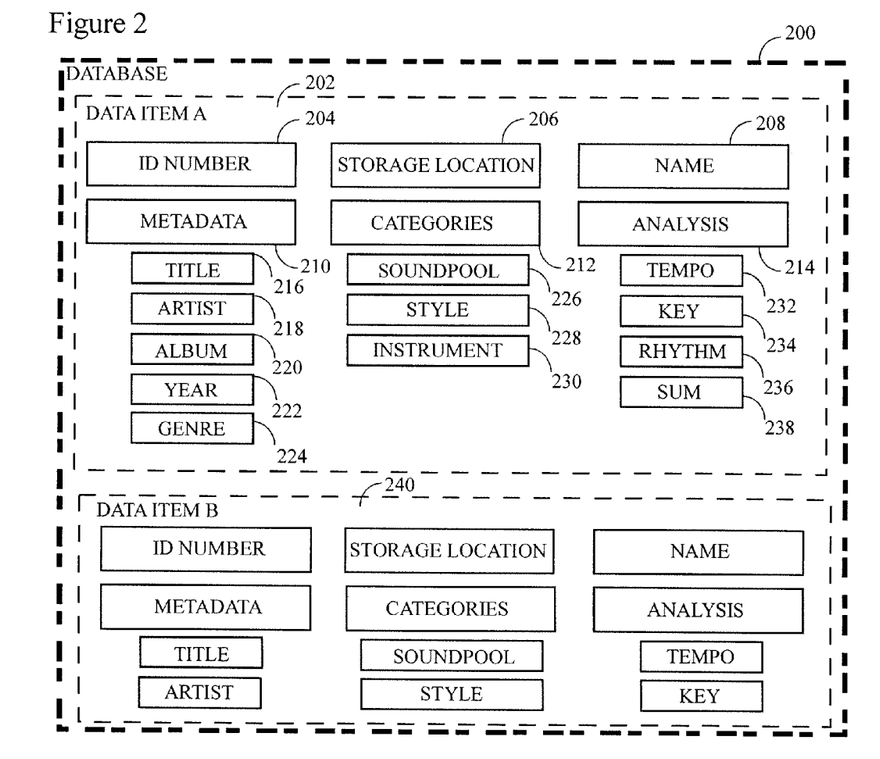
FIG. 2 illustrates a preferred structure of the database and the contents of the associated media data vector.

Turning next to FIG. 2, this figure illustrates a preferred structure of the database 200 and a preferred content of the data vector associated with each data item. The database 200 is the foundation of the instant invention. The user will preferably provide the database with audio content by identifying a location on the user's personal computer where it is stored. In some embodiments, the instant invention will search the hard disc(s) of the personal computer (to include searching network devices) and audio items will be automatically inserted into the database when detected.

For each data item 202 that is newly added into the database, the instant invention will preferably generate a data vector that will be associated with that item thereafter. The data vector will preferably contain a variety of information types. It will preferably contain an ID number 204 which will be used to identify the item and will be associated with this item after it is written to the database. The data vector will also preferably contain information regarding the storage location 206 of the item. This storage location might be the directory (e.g., full directory path) on the hard disk where the item is stored. The file name 208 of the item will also preferably be stored in the data vector. This information and the information regarding the storage location will be used by the instant invention to access each item when the audio work is needed for preview or insertion into a playlist or multimedia work.

The data vector additionally will preferably contain values of the following sort: metadata 210, categories 212 and analysis 214. The information stored in these sub-sections will preferably be extracted from the item during the analysis step that will preferably be conducted at the time the item is inserted into the database. The meta-data sub-section will preferably contain information such as the title 216, the artist 218, the album 220, the year 222, the production year, and the genre 224. The values stored in these fields will preferably be extracted from the data item (e.g., MP3 file) itself, because most audio items are distributed with these values already in place.

The categories sub-section will preferably store information regarding the sound pool 226, the style 228 and the instrument 230 of the data item. This information will also preferably be extracted directly from the audio item and stored in the corresponding data field by the original provider of the audio item itself. The data values describing the sound pool, style and instrument to which a data content item might belong will preferably be used in the generation of the visual representation of the database as described hereinafter. This information will be used to generate the different levels of the visual representation, with content belonging to the same sound pool, style or instrument being positioned adjacent to each another.

The data that will be stored in the analysis sub-section of the data vector will preferably be obtained via an analysis 214 of the musical characteristics of the data item. Values associated with tempo 232, key 234, rhythm 236, etc., will preferably be stored in the corresponding data vector of the audio item. It should further be noted that any number of other musical characteristics might be analyzed by the instant invention. The audio characteristics mentioned previously are offered only as examples and should not be used to limit the scope of the instant invention.

Additionally, the instant invention will preferably generate and store a composite value 238 which, in the preferred embodiment, will be a scaled summation of the items in the data vector. This sum (or other composite value) will be used to compare different audio items when the instant invention is used in the context of media management. The sum will preferably be created by adding together the values of the individual analysis results, which will preferably have been normalized before summing.

The normalizing step will preferably be carried out by comparing the analysis result with a predetermined threshold associated with each individual musical characteristic. For example, the tempo characteristic might have a different threshold value than the key characteristic. This sum (or other composite value) will then preferably be used as the starting point in the generation of the visual representation in the context of media management as will be explained in greater detail below. In some preferred embodiments, each analysis value will be normalized to lie within the same range (e.g., 0-10), by subtracting a constant value (e.g., the mean or median) and then scaling the resulting values to lie in the interval indicated.

Figure 3:
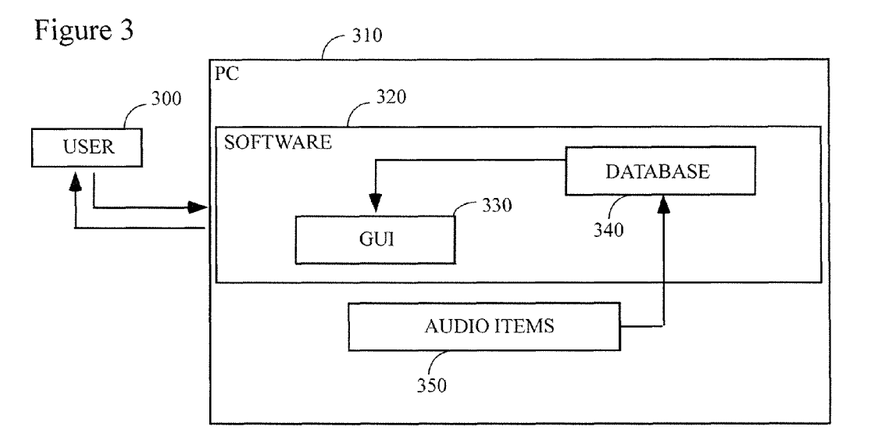
FIG. 3 contains an illustration of the preferred general dataflow of the instant invention.

FIG. 3 illustrates the preferred components of the instant invention and the data flow between each. The user 300 will be the initiating party. The user will preferably interact with the personal computer 310 via familiar interaction methods such as a mouse, keyboard, etc. The instant invention will preferably be implemented as part of a computer program 320 that runs on a personal computer 310. A database 340 will preferably be accessed by the instant program 320, the database 340 preferably functioning as data storage and data management resource for the instant invention. A number of different data items 350 will be stored on the computer 310. The user 300, by interacting with the personal computer 310, will provide the information about the location and number of data items 350 to the program 320. The software 320 will preferably add the data items 350 to the database 340 and provide a visual representation of the data items to the user via the graphical user interface 330.

Figure 4:
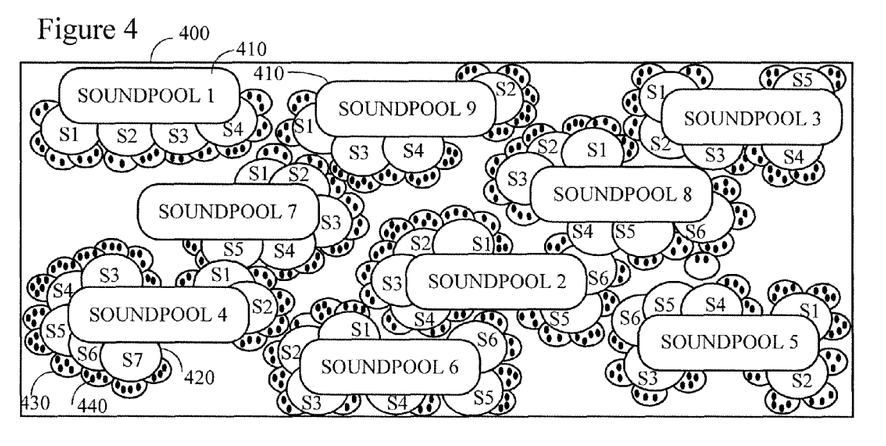
FIG. 4 illustrates the graphical user interface of the instant invention in the media creation mode in a first phase.

As is generally indicated in FIG. 4, in a preferred embodiment a user of the instant invention will be presented with a computer screen display 400 which will contain a display of components of the sort generally indicated in this figure. This figure contains a representation of a preferred graphical user interface of the instant invention as it would appear in media creation mode. The user will preferably be presented with a full screen visual representation via the graphical user interface. It is, however, also possible that this display might only be a part of the graphical user interface of a separate media creation program, wherein, for example, this visual representation might take up only a small part of the screen.

FIG. 4 displays an example arrangement of the digital data content, wherein the content is organized according to the data stored in the categories sub-section of the data vector. The instant invention will preferably read the data from the data vector and generate the visual representation with graphical objects representing the sound pool 410 to which the data content item might belong. Additionally the information regarding the musical style will preferably also be extracted from the data vector. Graphical objects that represent the styles 420 (i.e., S1, S2, S3, etc.) will preferably also be presented on-screen. These graphical objects will preferably be inserted adjacent to the sound pools to which they belong, so that the user will be able to quickly tell which sound pool contains which (and how many different) styles. Additionally, the instant invention will preferably extract the information regarding the instrument to which the data item belongs and insert graphical objects into the visual representation to identify the instruments 430 and the connection between styles and instruments.

Icons representative of the data items themselves will preferably also be displayed in the visual representation. These items are preferably displayed as the smallest selectable graphical objects 440 in the initial view of the database. The graphical objects 440 have been illustrated as simple filled-circles in FIG. 4, but it should be clear that other, more complex, icons could certainly be used instead. Further, a different icon might be selected (e.g., a musical note, sheet of music, etc., instead of a filled circle) and/or each icon might be selected to be representative of some additional characteristic of the associated audio file. For example, in FIG. 4 those audio items that are relatively slow (e.g., that have a tempo that is less than a predetermined BPM) might be indicated with a red-filled circle, whereas those with a faster tempo might be green-filled. In other preferred embodiments, the icon might reflect the instrument type (e.g., an icon of a piano for piano music, a horn icon for an audio file that contains horns, a female face for a female singer, etc.). Thus, when the terms "graphical objects" and "icons" are used herein those terms should be broadly interpreted to include nondescript icons such as squares, circles, stars, etc., as well as more complex icons, which icons may or may not be chosen to represent some aspect of the audio item that it represents.

By interacting with the mouse or keyboard (or other computer interactive method) the user will be able to move the cursor across the visual representation. The instant invention will preferably respond by displaying information about selected graphical objects—sound pool, style, instruments and digital content items—once the cursor is positioned proximate to or above a particular icon (e.g., hovered above).

Figure 5:
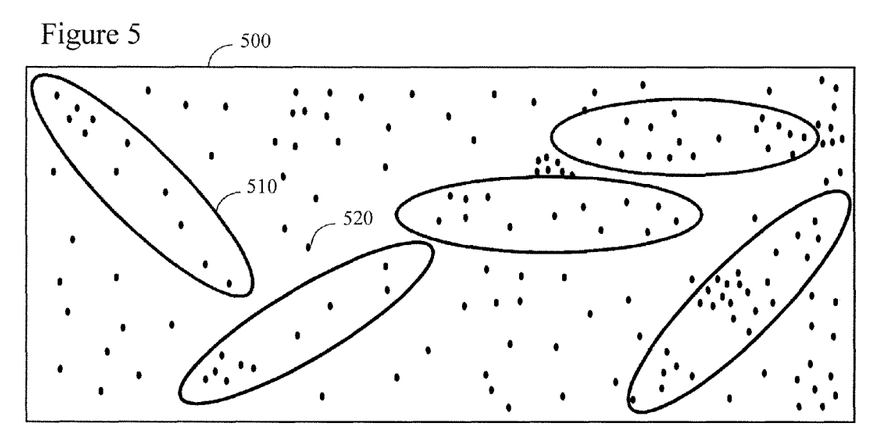
FIG. 5 displays the graphical user interface of the instant invention in the media management mode in a first phase.

Turning next to FIG. 5, this figure illustrates a preferred graphical user interface that shows the visual representation of the instant invention as it might appear in the media management mode. In this mode the visual representation is comparable to a starry sky 500, with the individual audio items 520 being positioned in the sky. This visual representation, as was the case previously in the media creation mode, might be displayed to the user in fullscreen. However, it is also possible that it might occupy only a portion of the screen. To populate the display, the instant invention will preferably select the sum from the analysis sub-section of the data vector of each data content item. This value will be used to place the graphical representations of the data content items 520 within the "starry sky." As can be seen, a typical display of this sort produces some regions that contain a lot of graphical objects and others where there are regions with few or none. The instant invention will be able to quickly generate a survey of the digital audio collection of a user, with the preferences in music styles being visually identifiable as accumulations of graphical objects.

With respect to the placement of the individual icons within the screen coordinate system of FIG. 5, although this display might be created in many different ways, according to a preferred embodiment, the "X" and "Y" screen coordinates will be derived from metadata values. That is, in some preferred embodiments the "X" will be the summary/central value (e.g., the sum or average of the meta data items) and the "Y" coordinate might be a value calculated from the audio item itself (e.g., BPM, key, etc.). In other preferred arrangements, the position of icons could be determined by arbitrarily positioning the sound pools on the screen and then placing the individual icons at distances from the sound pool center depending on the degree to which they are like other items in that pool (e.g., with audio items that are "typical" being positioned near the geometric center of the pool and those that are less like the others being positioned at distances that are further away in a radial direction). What is important, though, is that icons of audio works that are similar to each other should be positioned on the screen close to each other. Those of ordinary skill in the art will readily be able to devise alternative methods of placing the icons on the screen display.

To help the user to more quickly survey the screen display, the instant invention will preferably use data values from the metadata in the data vector of each audio item. For example, the data that describes the genre will preferably be extracted from the metadata and that value will be used to choose the graphical objects 510 that represent the individual genres. In some preferred embodiments, the metadata values will be extracted in real time as the audio items are read from the database. In that case, the data vector (which, of course, might consist of a single item) could be maintained in computer RAM (or other storage) while the instant invention is operating. Thus, in the text that follows, when the term data vector is used, that term should be understood to include data constructs that contain one or more metadata elements, with the data vector being preferably stored together with the audio item in the database, or, alternatively, calculated and then kept in program memory (or stored elsewhere) and accessed as needed. Of course, at the conclusion of a program run the metadata that has been calculated on the fly might be stored (in the database or elsewhere) or discarded, as the case may be.

Preferably, the genre of each audio item will be used to position that item on the screen, with the graphical objects that represent the data items preferably being placed within the graphical objects representing the appropriate genre. Preferably, when the user hovers the cursor for a short period of time (e.g., one second) over a screen object, the instant invention will dynamically display information about the audio clip represented by that object. Additionally, if the cursor is hovered for a longer period of time (e.g., three to five seconds), the instant invention will preferably automatically begin playing the currently selected item.

Figure 6:
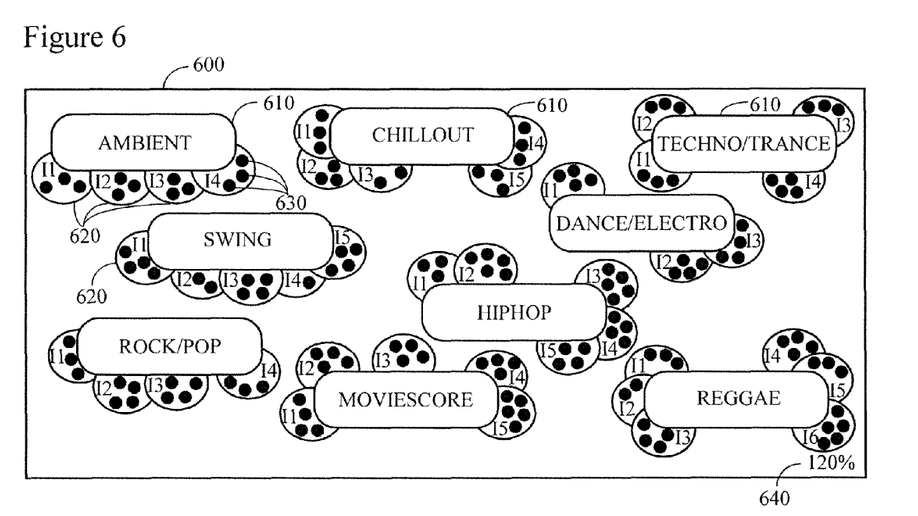
FIG. 6 illustrates the graphical user interface of the instant invention in the media creation mode in a second phase.

Turning next to FIG. 6, this figure represents a preferred graphical user interface of the instant invention as it would appear in the second phase of the media creation mode. In this phase the user will preferably be able to initiate a zoom-in movement by either moving, for example, the mouse forward or by turning the mouse wheel forward. In this figure the user has positioned the cursor above a sound pool and activated the zoom option. The instant invention preferably automatically updates the visual representation 600 according to the zoom movement. Preferably, the graphical user interface will inform the user of the percentage of the current zoom 640 relative to the initial view of the complete data content. Additionally, the instant invention will preferably select the data items that are stored within the selected sound pool and create a visual representation of that content with graphical objects representing the style 610, the instruments 620 and the individual data items 630. The positioning of each graphical object will preferably be carried out according to a predetermined hierarchical order with the sound pool being on the highest level, the style on the next lower level, the instruments one level lower than the style, and the data items being on the lowest level.

Figure 7:
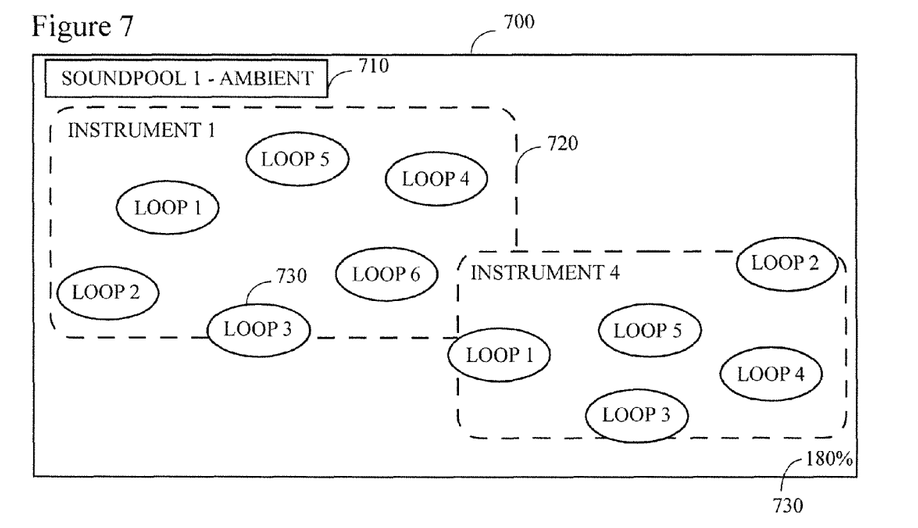
FIG. 7 contains an illustration of the graphical user interface of the instant invention in the media creation mode in a third phase.

FIG. 7 depicts the graphical user interface of the instant invention as it will preferably appear in the third phase of the media creation mode. In this phase the user has initiated a further zoom-in movement. For purpose of illustration, the contents of FIG. 7 might be seen as a continuation of the example of FIG. 6. In this figure, the user has selected a specific style in preparation for selecting one or more individual audio items ("loops") for insertion into a media work. The instant invention will preferably automatically provide the user with an updated visual representation 700, with the digital content being displayed at the instrument level 720. The user will preferably be informed of the current location of the visual representation in two ways. First, the instant invention will preferably display information 710 about the sound pool and style to which the currently displayed instruments and data items belong. The instant invention will preferably also display information about the current zoom factor 730 (in percent). The interaction options for the user (e.g., moving the cursor over the visual representation and previewing as well as inserting content into the media work) will preferably be available to the user after every zoom step.

Figure 8:
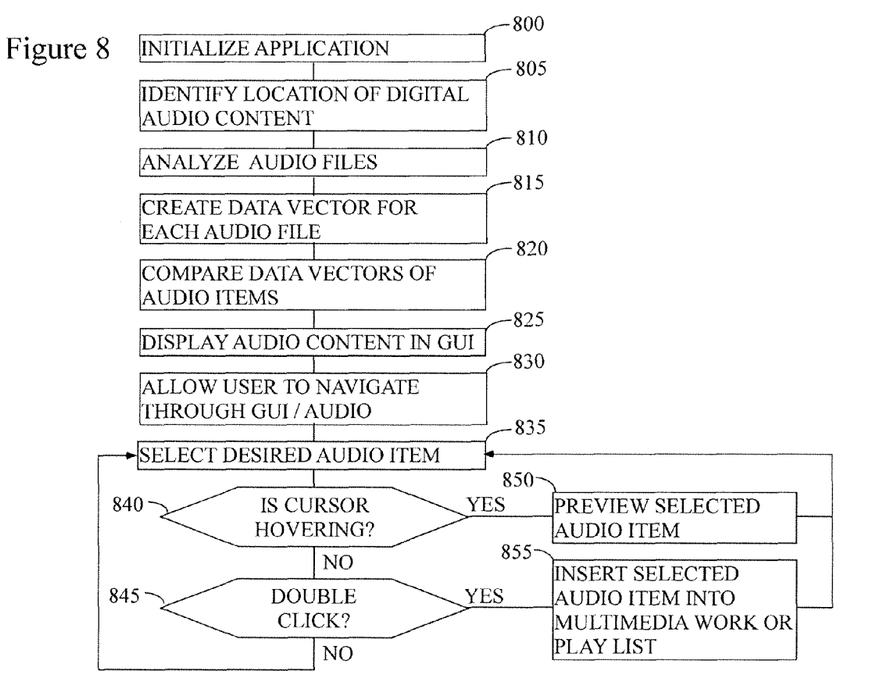
FIG. 8 illustrates the preferred general workflow of the instant invention for both modes.

FIG. 8 illustrates a preferred general operating logic of the instant invention. As a first preferred step 800, the instant invention, whether operating in digital media management mode or the media creation mode, will be started and initialized according to methods well known to those of ordinary skill in the art.

Next, the user will preferably identify the storage location of the digital audio content 805. This step could be performed every time the user intends to add new digital audio content into the database. However, it will preferably also be possible to select a storage location (e.g., a folder) on the hard disk which will then be automatically scanned by the software each time the program is activated.

In the next preferred step, the instant invention will preferably run an analysis of the digital audio 810. Preferably, this analysis will include the extraction of some or all of the metadata that is associated with each digital audio item. Preferred metadata types include genre, title, artist, creation year, album name and creation year, with the metadata preferably having been added to the digital audio content to allow for a better categorization of the content. Such metadata might also preferably include information regarding the sound pool, style and instrument to which the audio content belongs, etc.

The extracted metadata will then preferably be stored in a data vector 815 that has been created to hold the associated information for each of the each audio items. Additionally, the instant invention will also preferably initiate a computerized analysis of the musical characteristics of each data item. Such musical characteristics might include, for example, quantitative aspects of the audio work such as tempo, key, etc.

In a next preferred step, the instant invention will preferably compare the metadata values that are stored in the data vectors of the audio items 820. The results of this comparison will be used to form the visual representation of the audio content in the graphical user interface 825.

In the media management mode, the instant invention will preferably select a composite value (e.g., a sum) and by using this value will be able to identify audio items that are similar to each other. The graphical objects representing similar items will then preferably be positioned adjacent to each other in the visual display. Additionally, the instant invention will preferably run a cross check of the genre metadata in order to verify that each graphical object correctly identifies an audio item as belonging to a specific genre.

In the media creation mode the instant invention will preferably select the category information (e.g., sound pool, style, instrument) as the starting point for the creation of the visual representation in the graphical user interface 825.

As a next preferred step, the user will preferably navigate within the visual representation 830 using familiar interaction devices like a computer mouse or a computer keyboard. In the next preferred step, the user will preferably be able to select a digital audio item 835 from within the visual representation in the graphical user interface. The instant invention provides two preferred selection options. The first option will be selecting a digital audio content item for preview by the user 850. To activate this option, the user will preferably position the cursor over a desired digital audio item. By hovering 840 the cursor for a predetermined amount of time, the instant invention will preferably automatically provide the user with information about the selected digital item and will also initiate a preview of the item.

In the second option, the user will preferably be able to insert the selected audio item into, e.g., a playlist (media management) or a multimedia work (media creation) 855. The user will preferably position the cursor above the icon that corresponds to the desired audio item and double click it (step 845) if a computer mouse is used or utilize an analogous method when using the computer keyboard. After the double click, the instant invention will preferably automatically insert the selected item into the corresponding target application.

Figure 9:
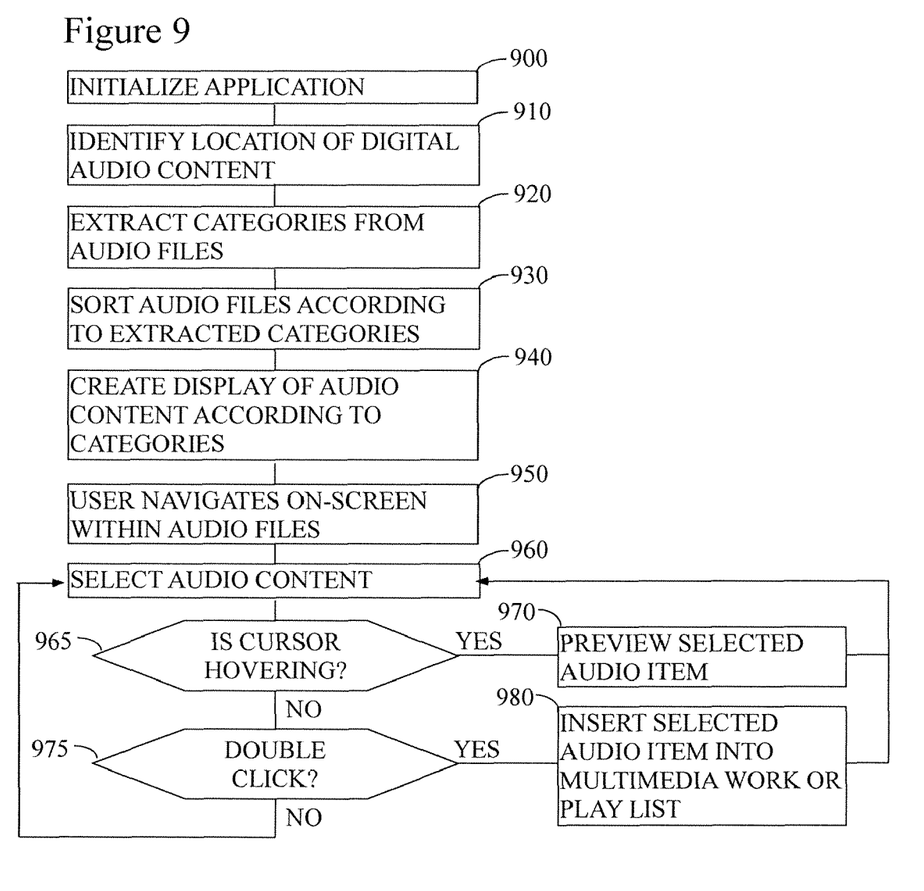
FIG. 9 depicts a preferred workflow of the instant invention when implemented in media creation mode.

Turning next to FIG. 9, this figure contains a preferred workflow of the instant invention when implemented in the context of media creation. In a first preferred step 900, the media creation program will preferably be started and initialized according to methods well known to those of ordinary skill in the art.

In a next preferred step, the user will preferably inform the program of the storage location of the digital audio content 910. In some embodiments, the location will be identified using a static approach, e.g., where the user navigates through the computer's directory structure and selects each storage location on the hard disk. However, it is also possible that the user will initiate an automatic search of the entire hard disk content, or define a specific folder which is continually checked for new content.

Next, the instant invention will preferably extract the category metadata from the data vector for each digital content item 920. The category metadata identifies to which sound pool, which style, and which instrument an audio item belongs. The data that describes the category will preferably have been provided by the instant inventors or the original providers of the digital audio content.

In the next preferred step the instant invention will preferably sort the audio content according to the extracted categories 930. After they are sorted, items that belong to the same sound pool, style or instrument will preferably be displayed by positioning them adjacent to each other when the instant invention creates the on-screen representation (step 940). This visual representation will preferably be dynamic, i.e., if the user decides to add additional audio items at any point, the visual representation will preferably be updated with new graphical objects representing the newly added content. The user will preferably be able to see database changes reflected on screen in real time.

In a next preferred step, the instant invention will allow the user to move around and navigate within the visual representation 950 using a mouse or a keyboard. The user will preferably be able to move in vertical and horizontal screen directions, with the instant invention dynamically updating the visual representation as the user moves the cursor. Additionally, the user will preferably also be able to initiate movement in a third dimension by zooming into or out of the visual representation.

As a next preferred step, the user will preferably be able to select audio items 960, wherein this selection will be accomplished by moving the cursor over an item. Placing the cursor over an item will preferably cause the instant invention to automatically present a window to the user that contains information about the selected content item (e.g., name, location, etc.). If the user wants to hear a preview 975 of the selected audio item, the user will preferably hover 965 the on-screen cursor above an item for a predetermined period of time. The instant invention will preferably then initiate playback of the selected item. Preferably, the preview playback will be controlled via a new window that contains conventional playback controls (e.g., "play," fast forward, "stop," etc.). If the user desires to add the selected and/or previewed item to a multimedia work 980, he or she will preferably only need to position the cursor above the desired item and double click 970 or otherwise select it. The instant invention will then insert the selected item into the multimedia work.

Figure 10:
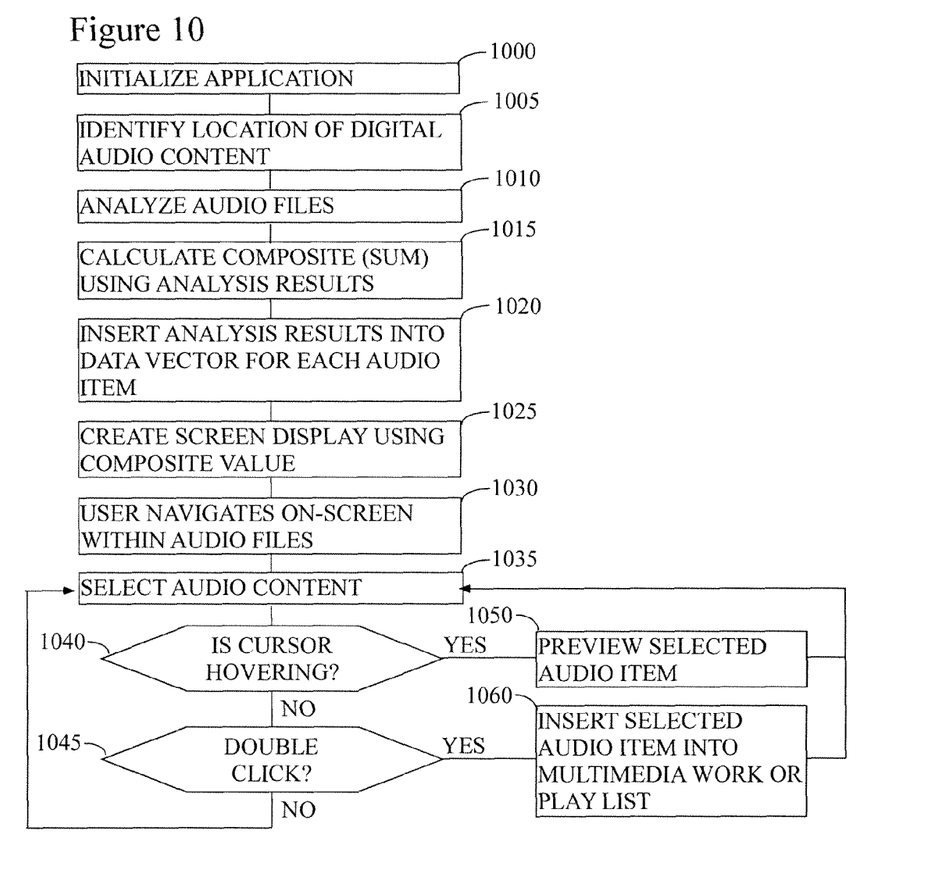
FIG. 10 displays a preferred workflow of the instant invention when implemented in the media management mode.

Turning next to FIG. 10, this figure illustrates a preferred workflow of the instant invention when operating in media management mode. In a first preferred step 1000, the media management program will be started and initialized according to methods well known to those of ordinary skill in the art. In the next preferred step the user will identify the storage location of the audio content 1005 that is to be integrated into the associated database. In conjunction with this integration, the instant method will preferably then analyze 1010 each audio item to determine its musical characteristics. The analysis will preferably obtain parameter values for musical characteristics such as tempo, key etc. Additionally, as a part of the analysis step, the instant invention will also preferably create a characterizing value 1015, wherein this value is preferably calculated by summing together normalized parameter for values that have been returned by the analysis. The instant invention will preferably select the analysis values associated with musical features, normalize them as discussed previously, and sum them together to produce the characterizing value.

These analysis data values, both normalized and unnormalized, and the characterizing value will then preferably be stored in a data vector 1020 that is associated with a each audio item. Additionally, the data vector will preferably also contain metadata related to each audio item.

In a next preferred step, the instant invention will preferably create the visual representation 1025, wherein the graphical objects representing data items whose characterizing values are similar will be positioned adjacent to each other on the screen. Additionally, the preferred method will preferably also extract a portion of the metadata for the audio items. Based on that extraction, the instant invention will preferably compare the metadata and, for audio items whose metadata is the same, additional graphical objects will be inserted into the visual representation. These additional graphical objects represent the extracted metadata and are designed to help the user distinguish between groups of audio items by visually providing, for example, genre information.

As a next preferred step, the user will be able to interact 1030 with the on-screen display using a mouse, keyboard, etc. The user will preferably be able to maneuver horizontally and vertically as well as in the third dimension (i.e., zoom-in or zoom-out action). The instant invention will preferably dynamically and automatically update the visual representation after each cursor movement.

In a next preferred step, the user will be able to select audio items 1035 for preview 1045 or for insertion 1060 into a multimedia work or playlist. To preview an item, the user will preferably only need to position the cursor 1040 above that item and the instant invention will automatically, after a predetermined amount of time, begin a preview.

To insert an item into a playlist, the user will preferably double click that item or otherwise select it. The instant invention will then preferably automatically insert the selected item into a playlist 1060. Preferably, the selected item will not be inserted into the playlist by copying the audio file but instead a link to that file will be added to the playlist.

Figure 11:
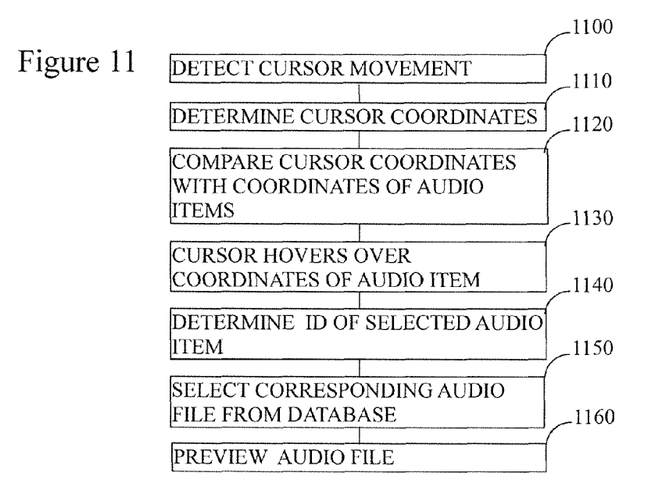
FIG. 11 depicts a preferred operating logic suitable for use with the instant invention when selecting an item for preview.

Turning next to FIG. 11, this figure depicts the preferred steps of the instant invention that will be carried out when an item is selected for preview. In a first preferred step, the instant invention will monitor and detect the cursor movement in the visual representation 1100. Furthermore, and in a next preferred step, the method will determine the current coordinates of the cursor in the visual representation 1110. Next, the cursor coordinates will preferably be associated with the screen coordinates of one of the audio files 1120. Preferably, the audio file coordinates will be read from the database as part of the data vector for each digital item.

The instant invention will also preferably monitor the time the cursor is stationary and, if the instant invention detects a hovering of the cursor at coordinates near those of an audio item 1130 the method will preferably determine the ID of the audio item from the coordinate values 1140.

In the next preferred step the instant invention will read the selected audio item from the database according the determined ID 1150 and will, in the next step, initiate the preview of the content item in the visual representation 1160.

Figure 12:
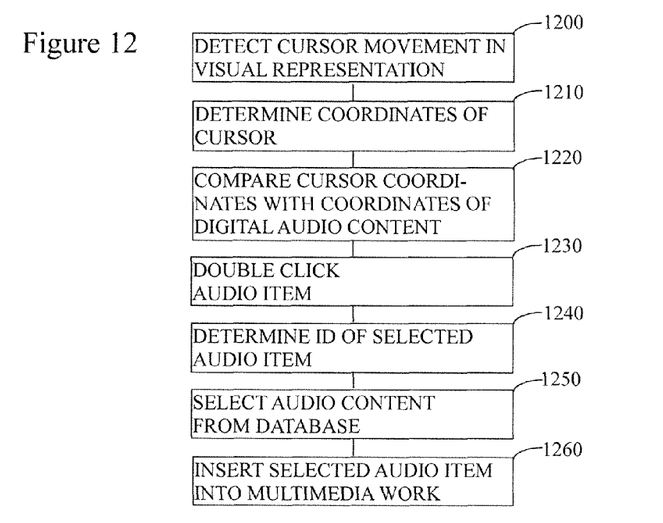
FIG. 12 illustrates a preferred operating logic of the instant invention when selecting an audio item for insertion into a media creation framework.

Turning next to FIG. 12, this figure illustrates the preferred steps of the instant invention when selected digital content is to be inserted into a multimedia work. As a first preferred step, the instant invention will monitor the on-screen cursor movement 1200, and identify those instances where the cursor passes near (or stops at) an audio item 1210, the cursor coordinates being used to identify individual graphical objects. The corresponding coordinates of the audio content will preferably be stored in the data vector of each audio item.

The instant invention will also preferably monitor for other user generated events, e.g., single or double clicks of the mouse 1230. Receipt of such actions will preferably cause the selected item to be inserted. The ID 1240 of the item proximate to the cursor coordinates will, in the next preferred step, be used to select the item from the database 1250 so that it can be integrated into the multimedia work 1260.

CONCLUSIONS

Of course, many modifications and extensions could be made to the instant invention by those of ordinary skill in the art. For example, in one preferred embodiment it might be possible to extend the functionality of the instant invention to media types other than audio. Additionally, it might be possible to use the instant invention as a generic approach to the display and selection of content. Furthermore it might be possible to extend the audio content approach by integrating an internet based store solution into the visual representation, thereby providing the user with visual access to content that is similar to that already owned by the user. Such an approach could further be enhanced by offering the user the possibility to purchase the newly provided content with a simple double mouse click, for example.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of creating a musical work, comprising the steps of:
   (a) accessing a database comprising a plurality of digital audio items, each of said plurality of audio items having at least one metadata item associated therewith, each of said at least one metadata item being descriptive of a characteristic of said associated musical work;
   (b) choosing one of said plurality of digital audio items;
   (c) determining at least one metadata item associated with said chosen audio item;
   (d) using any of said at least one metadata item determined for each of said chosen audio items to determine a hierarchical order and a screen location based on said hierarchical order;
   (e) displaying an icon associated with said chosen one of said plurality of digital audio items on a display device proximate to said screen location;
   (f) performing at least steps (a) through (e) a plurality of times for at least two different chosen audio items, thereby displaying a plurality of icons on the display device, each of said displayed icons being associated with one of said at least two different chosen audio items;
   (g) requiring a user to use said hierarchical order to select at least two of said plurality of icons on the display device;
   (h) for each of said selected at least two icons, determining an audio item associated therewith, thereby determining at least two audio items;
   (i) using each of said determined at least two selected audio items in said musical work; and,
   (j) performing the musical work for the user.

2. The method of creating a musical work according to claim 1, wherein step (e) comprises the step of:
   (e1) displaying an icon associated with said chosen one of said plurality of digital audio items on a display device proximate to said screen location, wherein said icon is chosen to represent a metadata value of said chosen audio item.

3. The method of creating a musical work according to claim 1, wherein step (c) comprises the step of reading at least one metadata item associated with said chosen audio item from the database.

4. The method of creating a musical work according to claim 1, wherein said computer interaction device is selected from a group consisting of a computer mouse, a keyboard, and, a touch screen display.

5. The method of creating a musical work according to claim 1, wherein said metadata item is selected from a group consisting of a title metadata item, an artist metadata item, an album metadata item, a year metadata item, a genre metadata item, a style metadata item an instrument metadata item, a tempo metadata item, a key metadata and a rhythm metadata item.

6. A method of performing a musical work, wherein is provided an audio database containing a plurality of audio items therein, comprising the steps of:
   (a) selecting a plurality of said audio items;
   (b) calculating at least two metadata values for each of said selected plurality of audio items, thereby producing a plurality of metadata values, each of said plurality of metadata values being associated with one of said selected plurality of audio items;
   (c) using said plurality of metadata values to determine a hierarchical organization of said selected plurality of audio items and a corresponding plurality of screen locations for each of said selected plurality of audio items, said screen locations being determined in such a way that if said at least two metadata values associated with each of two different audio items are similar their corresponding screen locations will be proximate to each other;
   (d) placing an icon proximate to each of said plurality screen locations within a computer display according to said hierarchical organization;
   (e) allowing a user to select one of said icons using a computer interaction device;
   (f) determining which of said plurality of audio items is associated with said selected icon; and,
   (g) performing said audio item associated with said selected icon for the user.

7. The method of creating a musical work according to claim 6, wherein step (d) comprises the steps of:
   (d1) for each of said audio items, choosing an icon representative of a characteristic of said audio item, thereby choosing a plurality of icons, and,
   (d1) using said plurality of screen locations to place said plurality of icons within a computer display according to said hierarchical organization.

8. The method of creating a musical work according to claim 6, wherein said computer interaction device is selected from a group consisting of a computer mouse, a keyboard, and, a touch screen display.

9. The method of creating a musical work according to claim 6, wherein each of said metadata values is selected from a group consisting of a title metadata item, an artist metadata item, an album metadata item, a year metadata item, a genre metadata item, a style metadata item, an instrument metadata item, a tempo metadata item, a key metadata item, and a rhythm metadata item.

10. The method of creating a musical work according to claim 6, wherein step (e) comprises the step of:
    (e) allowing a user to select one of said icons using a computer interaction device, wherein said selection is indicated by a double click of a computer mouse.

11. A method of generating a visual representation of a plurality of digital audio items stored in a database, comprising the steps of:
    (a) accessing said database and said plurality of audio items;
    (b) analyzing each of said plurality of audio items to obtain two or more metadata items associated with each of said plurality of audio items;
    (c) creating a data vector for each of said plurality of audio items from said two or more metadata items associated with each of said plurality of audio items, thereby creating a plurality of data vectors, each data vector being associated with one of said audio items;
    (d) storing said plurality of data vectors in said database;
    (e) using said plurality of data vectors to create a corresponding plurality of screen coordinates, wherein said screen coordinates are chosen in such a way that if two data vectors contain similar values the corresponding created two screen coordinates are proximate to each other;
    (f) selecting an icon for each of said plurality of audio items, thereby selecting a plurality of icons, each of said icons being associated with one of said audio items and with said screen coordinates associated with said one of said audio items; and,
    (g) displaying each of said icons on a computer screen at a location proximate to said associated screen coordinates.

12. The method of creating a musical work according to claim 11, wherein each of said two or more metadata items is selected from a group consisting of a title metadata item, an artist metadata item, an album metadata item, a year metadata item, a genre metadata item, a style metadata item, an instrument metadata item, a tempo metadata item, a key metadata item, and a rhythm metadata item.

\* \* \* \* \*